(12) United States Patent
Chen et al.

(10) Patent No.: US 10,452,840 B2
(45) Date of Patent: Oct. 22, 2019

(54) DEVICES AND METHODS FOR CLASSIFYING AN EXECUTION SESSION

(71) Applicant: QUALCOMM Incorporated, San Diego, CA (US)

(72) Inventors: Yin Chen, Campbell, CA (US); Dong Li, Cupertino, CA (US); Vinay Sridhara, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 115 days.

(21) Appl. No.: 15/210,815

(22) Filed: Jul. 14, 2016

(65) Prior Publication Data
US 2018/0018456 A1    Jan. 18, 2018

(51) Int. Cl.
*G06F 21/55* (2013.01)
*H04L 29/06* (2006.01)
*H04W 12/12* (2009.01)

(52) U.S. Cl.
CPC ........ *G06F 21/552* (2013.01); *H04L 63/1441* (2013.01); *H04W 12/1208* (2019.01); *G06F 2221/033* (2013.01); *G06F 2221/2151* (2013.01)

(58) Field of Classification Search
USPC .......... 726/23, 2, 21, 36; 713/150, 163, 181; 380/255, 264, 276
See application file for complete search history.

(56) References Cited

U.S. PATENT DOCUMENTS

| | | | |
|---|---|---|---|
| 8,266,698 B1* | 9/2012 | Seshardi | G06F 21/53 726/22 |
| 9,225,740 B1* | 12/2015 | Ismael | G06F 11/362 |
| 2005/0108562 A1* | 5/2005 | Khazan | G06F 11/3604 726/23 |

(Continued)

FOREIGN PATENT DOCUMENTS

WO    2015085267 A1    6/2015

OTHER PUBLICATIONS

Zhao C., et al., "Discovering Program's Behavioral Patterns by Inferring Graph-Grammars from Execution Traces," 20th IEEE International Conference on Tools with Artificial Intelligence, 2008, vol. 2, pp. 395-402.

(Continued)

*Primary Examiner* — Sharif E Ullah
(74) *Attorney, Agent, or Firm* — The Marbury Law Group

(57) ABSTRACT

Methods, systems and devices compute and use the execution session contexts of software applications to perform behavioral monitoring and analysis operations. A mobile device may be configured to monitor user activity and system activity of a software application, generate a shadow feature value that identifies actual execution session context of the software application during that activity, generate a behavior vector that incorporates context into the values describing behaviors, and determine whether the activity is malicious or benign based, at least in part, on the generated behavior vector. The mobile device processor may also be configured to intelligently determine whether the execution session context of a software application is relevant to determining whether any of the monitored mobile device behaviors are malicious or suspicious, and monitor only the (Continued)

execution session contexts of the software applications for which such determinations are relevant.

28 Claims, 8 Drawing Sheets

(56) References Cited

U.S. PATENT DOCUMENTS

| | | | | |
|---|---|---|---|---|
| 2011/0145920 | A1* | 6/2011 | Mahaffey | G06F 21/564 726/22 |
| 2012/0159633 | A1* | 6/2012 | Grachev | G06F 21/56 726/24 |
| 2012/0210423 | A1* | 8/2012 | Friedrichs | G06F 21/564 726/22 |
| 2012/0260344 | A1* | 10/2012 | Maor | G06F 11/3688 726/25 |
| 2014/0096246 | A1* | 4/2014 | Morrissey | G06F 21/51 726/23 |
| 2014/0337862 | A1* | 11/2014 | Valencia | G06F 8/71 719/313 |
| 2014/0344927 | A1* | 11/2014 | Turgeman | H04W 12/06 726/22 |
| 2015/0121524 | A1* | 4/2015 | Fawaz | G06F 21/566 726/23 |
| 2015/0161024 | A1* | 6/2015 | Gupta | G06F 11/3612 714/47.3 |
| 2015/0172300 | A1* | 6/2015 | Cochenour | H04L 63/145 726/23 |
| 2015/0286820 | A1* | 10/2015 | Sridhara | G06F 21/566 726/23 |

OTHER PUBLICATIONS

International Search Report and Written Opinion—PCT/US2017/037270—ISA/EPO—dated Aug. 17, 2017.

* cited by examiner

DEVICES AND METHODS FOR CLASSIFYING AN EXECUTION SESSION

BACKGROUND

In behavioral monitoring and analysis systems, the context within which a software application executes tasks is not used to determine whether an activity of that application is malicious. For example, an activity that inherently requires user interaction (e.g., use of a camera, sending SMS message, etc.) is typically performed in a "foreground" execution state, so the performance of such an activity while the software application is in a "background" execution state may indicate that the activity is malicious. Yet this is not generally taken into consideration when evaluating software applications for malware.

Conventional malware detection systems, do not account for the context within which a software application executes tasks. Conventional malware detection systems may rely instead on just the operational state of the software application to determine whether the application is permitted to execute certain tasks. For example, applications executing in the foreground may be presumed to be benign, while the same behavior may be considered to be malicious if executed in the background. This classification is insufficient to determine a user's intent because software applications may begin execution in the foreground with full knowledge and permission of the user, but then move to the background as the user waits for the task to finish execution. An executing task does not become malicious simply because the operating system moves the software application to the background.

SUMMARY

Various embodiments include methods and computing devices implementing methods of determining an execution session context of a software application or process in a mobile computing device. Various embodiments may include a processor of a mobile computing device monitoring system activities and user activities of the software application or process to collect behavior information, and correlating system activities with user activities. Various embodiments may further include determining probabilities of the user activities and the system activities based, at least in part, on the behavior information, and generating an execution session context vector based, at least in part, on the correlated system activities and user activities, and the determined probabilities.

Some embodiments may further include selecting a behavior classifier model based, at least in part, on the execution session context vector, and using the selected behavior classifier model by the processor to determine whether the software application is benign. In such embodiments, selecting the behavior classifier model based, at least in part, on the determined execution session context may include selecting an application specific classifier model. In such embodiments, selecting the behavior classifier model may include identifying mobile computing device features used by the software application or process, and selecting the behavior classifier model to include the identified features.

Some embodiments may further include passing the execution session context vector to a second software application or process as input.

In some embodiments, monitoring system activities may include determining whether the software application or process is operating in foreground or background. In some embodiments, monitoring system activities may include monitoring system calls. In some embodiments, monitoring user activities may include determining whether the software application process was launched as a result of direct user interaction with the mobile computing device. In some embodiments, monitoring user activities may include monitoring user interactions with the software application or process. In some embodiments, monitoring user activities may include monitoring user interactions that indirectly engage the software application or process. In some embodiments, correlating system activities and user activities may include correlating system activities and user activities based, at least in part, on a timestamp for each of the user activities and at least a portion of the system activities. In some embodiments, generating an execution session context vector may include generating the execution session context vector based, at least in part, on the correlated system activities and user activities, and the determined probabilities is further based, at least in part, on static call preferences of the software application.

Various embodiments include a computing device having a memory and a processor configured with processor-executable instructions to perform operations of the embodiment methods summarized above. Various embodiments include a computing device having means for performing functions of the embodiment methods summarized above. Various embodiments include non-transitory processor-readable medium on which are stored processor-executable instructions configured to cause a processor to perform operations of the embodiment methods summarized above.

BRIEF DESCRIPTION OF THE DRAWINGS

The accompanying drawings, which are incorporated herein and constitute part of this specification, illustrate exemplary embodiment of the claims, and together with the general description given above and the detailed description given below, serve to explain the features of the claims.

DETAILED DESCRIPTION

Figure 1:
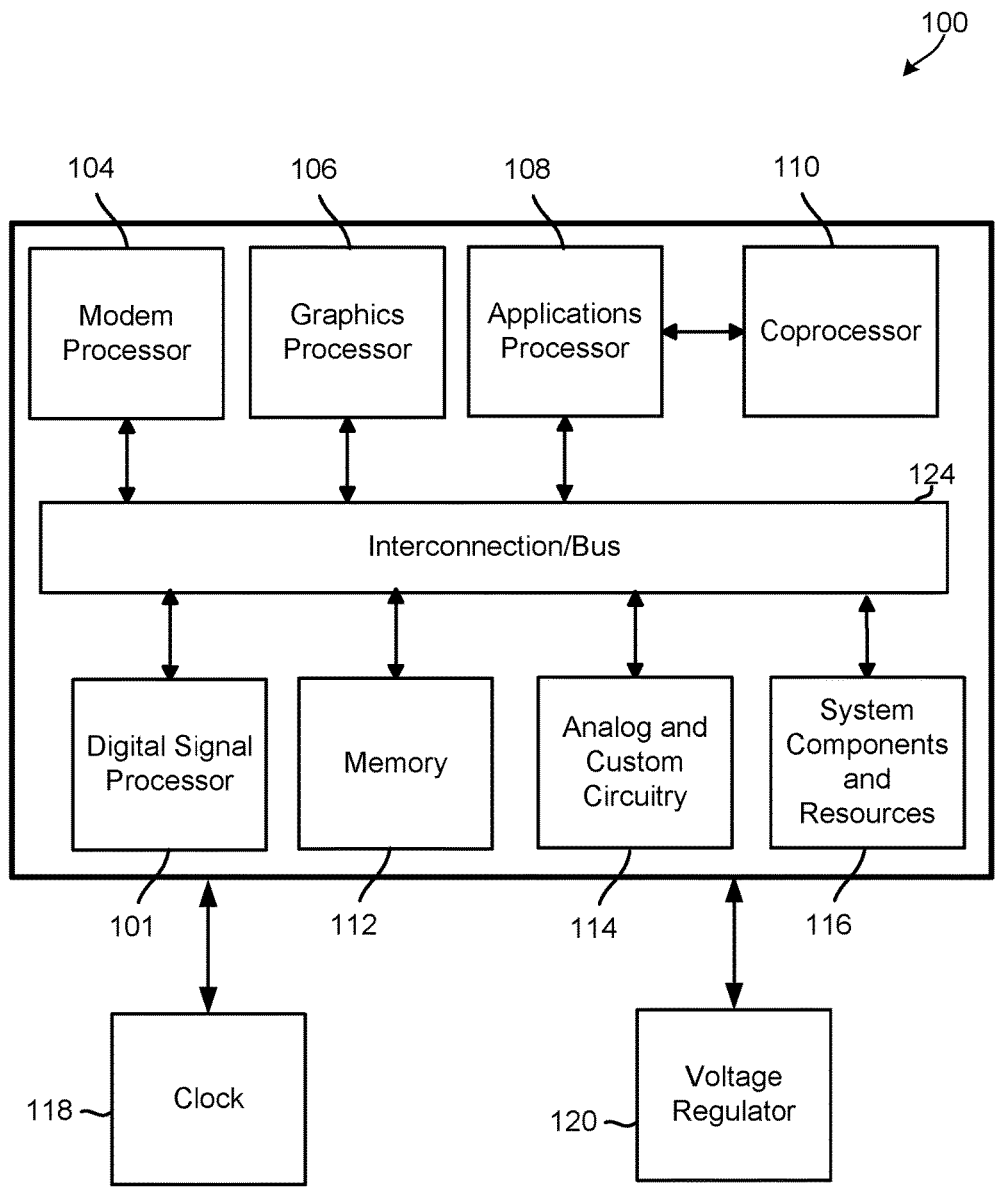
FIG. 1 is a component block diagram of an example system on chip suitable for implementing the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

In overview, the various embodiments include methods, and computing devices configured to perform the methods, of determining an execution session context of a software application or process in a mobile device. Various embodiments may include monitoring a number of system activities (e.g., operation state changes, API calls) and user activities (e.g., user interface interactions, user initiation of the software application) of the software application or process to collect behavior information. Various embodiments may include correlating the system activities and the user activities to each other to determine concurrent behaviors, determining activity probabilities based, at least in part, on the behavior information (e.g., the probability that the software application was launched by a user), and generating an execution session context vector based, at least in part, on the correlated system activities and user activities, and the determined activity probabilities. In various implementations, the methods and mobile devices configured to implement those methods may select a behavior classifier model based, at least in part, on the execution session context vector, and use the selected behavior classifier model to determine whether the software application is not benign. Such determinations may be used by the mobile device in determining whether to permit continued or future execution of the software application.

The terms "mobile device," "mobile computing device," "computing system" and "computing device" are used generically herein to refer to any one or all of servers, personal computers, and mobile devices, such as cellular telephones, smartphones, tablet computers, laptop computers, netbooks, ultrabooks, palm-top computers, personal data assistants (PDA's), wireless electronic mail receivers, multimedia Internet enabled cellular telephones, Global Positioning System (GPS) receivers, wireless gaming controllers, and similar personal electronic devices which include a programmable processor. While the various embodiments are particularly useful in mobile devices, such as smartphones, which have limited processing power and battery life, the embodiments are generally useful in any computing device that includes a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) is used herein to refer to a single module or package that contains multiple resources, computational units, cores and/or processors on two or more IC chips or substrates. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single mobile computing device. The proximity of the SOCs facilitates high-speed communications and the sharing of memory and resources. An SOC may include multiple multicore processors, and each processor in an SOC may be referred to as a core. The term "multiprocessor" is used herein to refer to a system or device that includes two or more processing units configured to read and execute program instructions.

The term "context" is used herein to refer to any information available to a process or thread running in a host operating system (e.g., Android, Windows 8, UNIX, etc.). Context may include operational state data and permissions and/or access restrictions that identify resources that the software application may access, as well as state information of the operating environment. Examples resources that the software application may access include operating system services, libraries, file systems, the duration and frequency of user interactions with a software application, sensor input access by the software application, API calls, whether the software application auto-launched, peripheral devices engaged, and communications received and/or sent.

In an implementation, the mobile device may be equipped with an execution context inference module that is configured to receive execution, event, and/or behavior information from various software and hardware components of the mobile device. Such information may include any or all of operating state information, event information (e.g., a surface touch, click, button actuation, etc.), information from sensors indicating activity/inactivity, CPU/GPU usage levels, battery consumption levels, information identifying an implemented functionality, resource state information, memory transaction information, communication transaction information, and other types of information related to the various behaviors, activities, operations, and events ongoing in the mobile device that are related to the execution of the software application.

Determining the execution session context of an executing software application based, at least in part, on observed behaviors occurring during or just prior to runtime may be useful to systems and methods that monitor mobile device behavior to identify performance degrading problems and malware. Generally, the performance and power efficiency of a mobile device degrade over time.

Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

Mobile devices are resource constrained systems that have relatively limited processing, memory, and energy resources. Modern mobile devices are also complex systems, and a large variety of factors may contribute to the degradation in performance and power utilization levels of the mobile device over time, including poorly designed software applications, malware, viruses, fragmented memory, background processes, etc. Due to the number, variety, and complexity of these factors, it is often not feasible to evaluate all the various processes, components, behaviors, or factors (or combinations thereof) that may degrade performance and/or power utilization levels of the complex yet resource-constrained systems of modern mobile devices. As such, it is difficult for users, operating systems, and/or application programs (e.g., anti-virus software, etc.) to accurately and efficiently identify the sources of such problems. Therefore, mobile device users currently have few remedies for preventing the degradation in performance and power utilization levels of a mobile device over time, or for restoring an aging mobile device to its original performance and power utilization levels.

The various embodiments for determining an application's execution session context may be used by comprehensive behavioral monitoring and analysis systems for intelligently and efficiently identifying, preventing, and/or correcting the conditions, factors, and/or mobile device behaviors that may degrade a mobile device's performance and/or power utilization levels over time. In such behavioral monitoring and analysis systems, an observer process, daemon, module, or sub-system (herein collectively referred to as a "module") of the mobile device may instrument or coordinate various application programming interfaces (APIs), registers, counters or other components (herein collectively "instrumented components") at various levels of the mobile device system.

The observer module may continuously (or near continuously) monitor mobile device behaviors by collecting behavior information from the instrumented component. The mobile device may also include an analyzer module, and the observer module may communicate (e.g., via a memory write operation, function call, etc.) the collected behavior information to the analyzer module.

The execution context inference module may use the collected behaviors in machine learning techniques to generate execution session context vectors representing the various events and circumstances associated with the execution of the software application.

The analyzer module may be configured to perform real-time behavior analysis operations, which may include performing, executing, and/or applying data, algorithms, classifiers or models (herein collectively referred to as "classifier models") to the collected behavior information to determine whether a mobile device behavior is benign or not benign (e.g., malicious or performance-degrading). The mobile device may use the results of this analysis to heal, cure, isolate, or otherwise fix or respond to identified problems.

Generally, each software application performs a number of tasks or activities on the mobile device. Certain tasks/activities inherently require that the operating system or software application (or process, thread, etc.) be in an execution state that supports or is compatible with those tasks/activities. For example, the use of a camera, activating a microphone to record audio, sending Short Message Service (SMS) messages, and the collection accelerometer data are all tasks/activities that typically require some form of user interaction with the mobile device (e.g., the user actuating the shutter-release button for the camera, typing text, hitting a send button, etc.). As such, these activities generally are typically performed in the "foreground" execution state or in another execution state that supports user interaction with the mobile device.

When user and system tasks/activities are performed in an execution state that does not support a high degree of user interaction with the mobile device, such as in the background, this operating condition may be an indicator that a mobile device behavior associated with that activity is malicious or otherwise merits additional or closer scrutiny, monitoring or analysis. That is, the specific execution state in which certain tasks/activities are performed in the mobile device may be an indicator of whether a mobile device behavior merits additional or closer scrutiny, monitoring, and/or analysis. However, execution state information alone is insufficient to determine whether the tasks/activities performed by an executing software application are benign/malicious. For example, a user may initiate a task requiring the software application to access and sort the user' contact list. Such action would normally take place in the "foreground" execution state. However, if the user accesses another software application or leaves the mobile device unattended for a duration, the contact list sorting operation may move to the "background" execution state. Thus, the software application may be performing a task/activity normally performed in a different execution state, but is not malicious, because the user initiated the task/activity. Other factors such as duration since last user activity, number of user interactions, nature of system calls, permissions exceeded, peripherals accessed, etc. may also be relevant in determining the execution session context occurring during software application runtime.

The various implementations include a mobile device equipped with an execution context inference module. The execution context inference module may execute within a processor of the mobile device that is configured to receive information from various software/hardware components of the mobile device, and apply machine learning techniques to the received information to compute the execution session context of that application just prior to or during runtime. These software/hardware components may be configured to monitor a wide variety of activities and tasks performed by or related to the execution of a software application in the mobile device, and thus have access to additional, more detailed and/or finer grained information than is typically made available by the operating system or software application. Thus, the execution context inference module may generate execution session context information that more accurately describes the user intent and the context of an executing software application's tasks/activities.

In various implementations, the analyzer module may be configured to use the execution session context information to select a classifier model that focuses on the features most relevant to analyzing a specific software application or behavior, to better determine the intent (malicious vs. benign) of the software application, and/or to better determine whether a mobile device behavior is performance-degrading or benign. Similarly, the observer module may be configured to use this information to better identify the features that require monitoring and/or to determine the granularity at which select features are to be monitored.

In various implementations, the observer and/or analyzer modules may be configured to use the execution session context information to select an application-specific lean classifier model that includes a focused data model that includes/tests only the features/entries that are most relevant for determining whether that particular software application is benign or not benign (e.g., malicious or performance-degrading).

Various implementations may include components configured to perform behavioral analysis operations to determine an execution session context of an application or process (e.g., running in the foreground, performing a particular activity, is idle, accessing a contacts list, etc.).

Various implementations may include components configured to apply machine learning techniques to determine an execution session context of a software application based, at least in part, on information obtained by monitoring the software application activity. The various implementations may use user interaction, execution state, static call dependence, and system resource usage to generate a model of device behavior.

Various implementations may include components configured to use a behavior model indicating a context (i.e., execution session context vector) within which a software application executes to determine whether behavior is malicious or benign.

The various embodiments may be implemented in a number of different mobile devices, including single processor and multiprocessor systems, and a system on chip (SOC). FIG. 1 illustrates an example SOC 100 architecture that may be used in computing devices implementing the various embodiments. The SOC 100 may include a number of heterogeneous processors, such as a digital signal processor (DSP) 101, a modem processor 104, a graphics processor 106, and an applications processor 108. The SOC 100 may also include one or more coprocessors 110 (e.g., vector co-processor) connected to one or more of the heterogeneous processors 101, 104, 106, 108. Each processor 101, 104, 106, 108, 110 may include one or more cores, and each processor/core may perform operations independent of the other processors/cores. For example, the SOC 100 may include a processor that executes a first type of operating system (e.g., FreeBSD, UNIX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The system components and resources 116 and custom circuitry 114 may include circuitry to interface with peripheral devices, such as cameras, electronic displays, wireless communication devices, external memory chips, etc. The processors 101, 104, 106, 108 may be interconnected to one or more memory elements 112, system components and resources 116 and analog and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks on chip (NoCs).

The SOC 100 may further include an input/output module (not illustrated) for communicating with resources external to the SOC 100, such as a clock 118 and a voltage regulator 120. Resources external to the SOC 100 (e.g., clock 118, voltage regulator 120) may be shared by two or more of the internal SOC processor and processor cores (e.g., DSP 101, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well known components (e.g., accelerometer, etc.) of modern electronic devices.

In addition to being implemented in an SOC 100 discussed above, the various implementations may be implemented in a wide variety of computing systems, which may include a single processor, multiple processors, multicore processors, or any combination thereof.

Figure 2A:
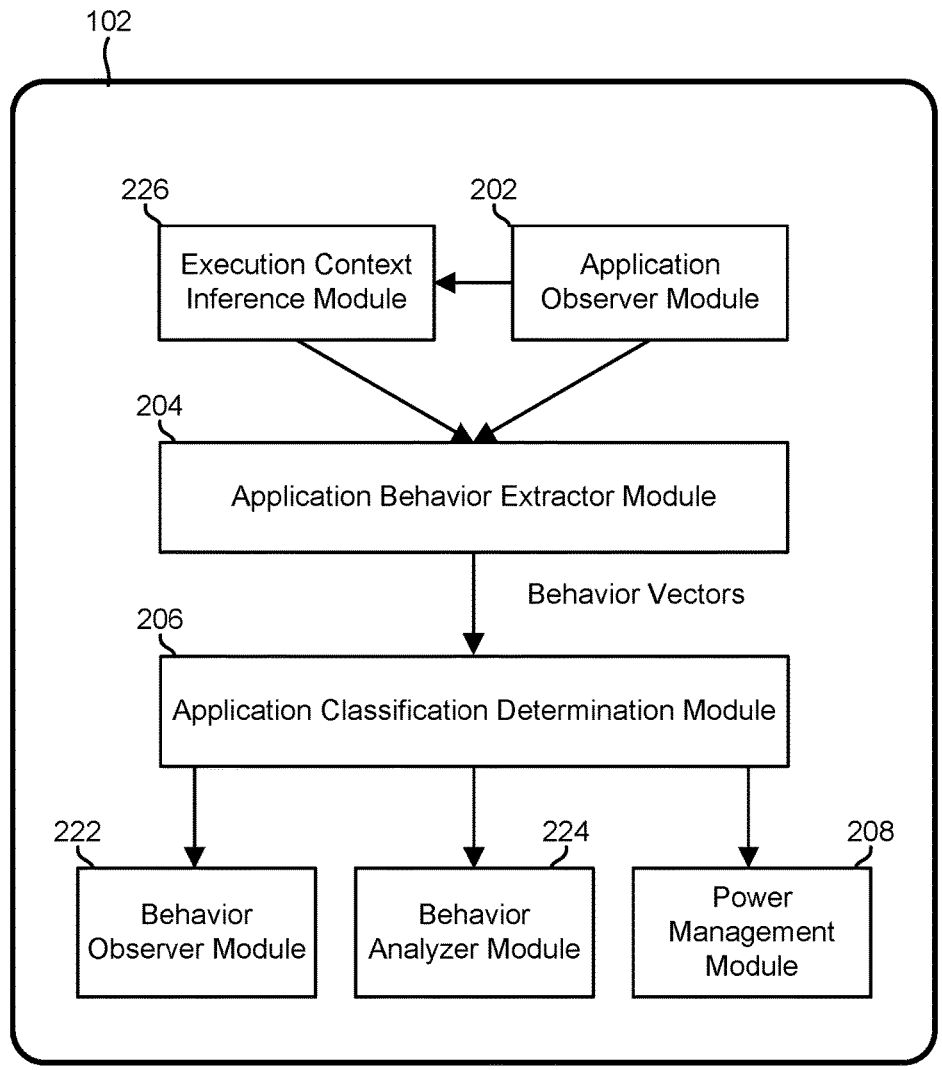
FIG. 2A is a block diagram illustrating logical components and information flows in an example mobile device configured to use machine learning techniques to determine the execution session context of a software application in accordance with the various embodiments.

FIG. 2A illustrates example logical components and information flows in an implementation mobile device 102 configured to use machine learning techniques to determine an execution session context of a software application of the mobile device. In the example illustrated in FIG. 2A, the mobile device 102 includes an application observer module 202, an execution context inference module 226, an application behavior extractor module 204, an application classification determination module 206, a power management module 208, a behavior observer module 222, and a behavior analyzer module 224

Each of the modules 202-224 may be implemented in software, hardware, or any combination thereof. In various implementations, the modules 202-224 may be implemented within parts of the operating system (e.g., within the kernel, in the kernel space, in the user space, etc.), within separate programs or applications, in specialized hardware buffers or processors, or any combination thereof. In an implementation, one or more of the modules 202-224 may be implemented as software instructions executing on one or more processors of the mobile device 102.

Figure 2B:
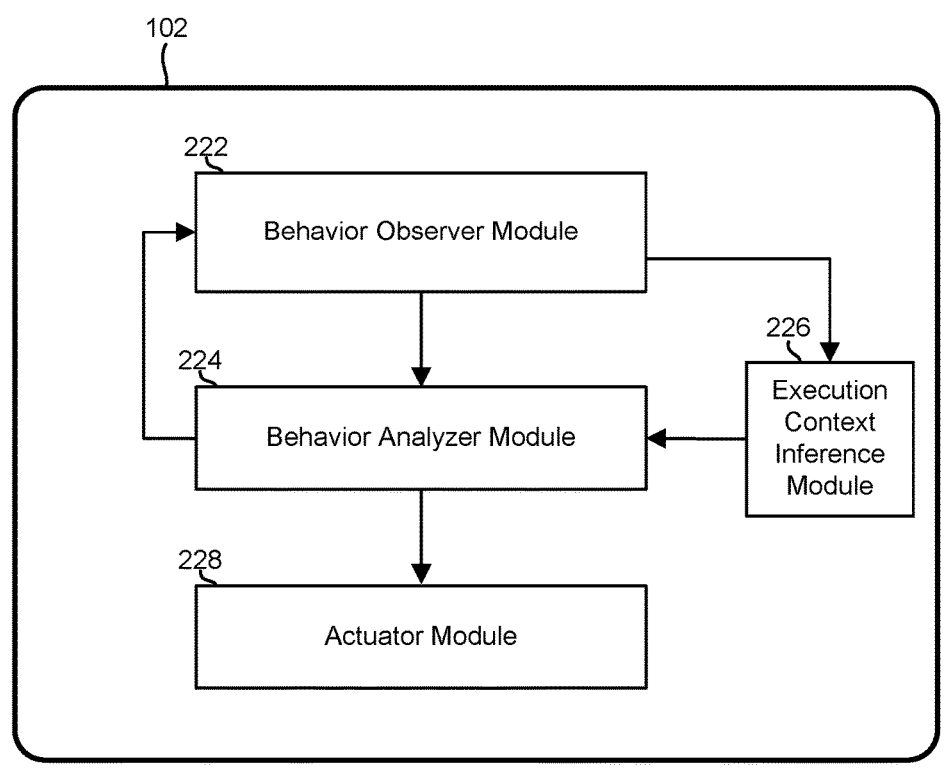
FIG. 2B is a block diagram illustrating logical components and information flows in an example mobile device configured to perform dynamic and adaptive behavioral observation and analysis operations based, at least in part, on the execution session context of a software application in accordance with the various embodiments.

The application observer module 202 may be configured to monitor various software and hardware components of the mobile device and collect information pertaining to the communications, transactions, events, or operations of the monitored components that are associated with the software application's performance of an operation or task, or its execution in a processing core of the mobile device. In various implementations, the application observer module 202 may be configured to monitor any or all of the features, behaviors, or components monitored by the behavior observer module 222, which is also illustrated in FIG. 2B and discussed in detail further below.

The application observer module 202 may also be configured to continually monitor the mobile device for changes in the mobile device's configuration and/or execution session context as a result of the operations of a software application. The application observer module 202 may also monitor configuration and/or execution session context changes that may impact the performance or effectiveness of the mobile device. The application observer module 202 may store the collected information in a memory (e.g., in a log file, etc.) and/or send (e.g., via memory writes, function calls, etc.) the generated observations to execution context inference module 226. The application observer module 202 may be configured to perform some or all of the functions of behavior observer module 222 described in greater detail with reference to FIG. 2B.

The execution context inference module 226 may be configured to receive the output of various observations stored by the application observer module 202 and may analyze the observations to determine an execution session context for the software application. The execution context inference module 226 may receive from the observer module information. Such observer module information may include software application API calls made, modification of execution session context from foreground to background, accessing of sensors, low level system calls, operating execution session context information, user activity event information (e.g., a surface touch, click, button actuation, etc.), information from sensors indicating activity/inactivity, CPU/GPU usage levels, battery consumption levels, information identifying an implemented functionality, resource execution session context information, memory transaction information, communication transaction information, application status change events, user interface interactions, and other types of information related to the various activities and events ongoing in the mobile device. These system activities and user activities collected by the application observer module 202 may be analyzed using machine learning techniques to determine a context under which the software application and its associated functions operate.

The application behavior extractor module 204 may be configured to generate one or more behavior vectors based the observations as analyzed by the execution context inference module 226 or information collected by the application observer module 202. The execution session context may be placed by the application behavior extractor module 204 into a vector or matrix to form a behavior vector. In various implementations, the application behavior extractor module 204 may be configured to perform any or all of operations that may be performed by the behavior analyzer module 224 (discussed in detail further below) to extract the behavior of the software application. The application behavior extractor module 204 may send the generated behavior vectors and/or the extracted behavior information the application classification determination module 206 for further analysis.

The application classification determination module 206 may receive behavior vectors and compare them to one or more behavior modules to determine whether the behavior of the software application is malignant or benign based, at least in part, on the circumstances under which it is operating. In an implementation, these behavior modules may be classifier models that include a plurality of test conditions suitable for evaluating or identifying the mobile device features used by a specific software application. The features used by the specific software application or a specific software application-type may be determined by monitoring or evaluating mobile device operations, mobile device events, data network activity, system resource usage, mobile device execution session context, inter-process communications, driver statistics, hardware component status, hardware counters, actions or operations of software applications, software downloads, changes to device or component settings, conditions and events at an application level, conditions and events at the radio level, conditions and events at the sensor level, location hardware, personal area network hardware, microphone hardware, speaker hardware, camera hardware, screen hardware, universal serial bus hardware, synchronization hardware, location hardware drivers, personal area network hardware drivers, near field communication hardware drivers, microphone hardware drivers, speaker hardware drivers, camera hardware drivers, gyroscope hardware drivers, browser supporting hardware drivers, battery hardware drivers, universal serial bus hardware drivers, storage hardware drivers, user interaction hardware drivers, synchronization hardware drivers, radio interface hardware drivers, and location hardware, near field communication (NFC) hardware, screen hardware, browser supporting hardware, storage hardware, accelerometer hardware, synchronization hardware, dual SIM hardware, radio interface hardware, and features unrelated related to any specific hardware.

In an implementation, the application classification determination module 206 may be configured to apply classifier models to the behavior vectors to infer, estimate, predict, or determine a classification (e.g., permissible/unauthorized, malignant/benign) for the software application based, at least in part, on the execution session context of the executing software application. That is, the application classification determination module 206 may generate malicious behavior detection information that is more accurate, detailed, and finer grained than the context-blind information provided by stock malware detection methods. In various implementations, the application classification determination module 206 may be configured to perform any or all of operations that may be performed by the behavior analyzer module 224 to determine the actual execution session context of the software application.

FIG. 2B illustrates example logical components and information flows in an implementation mobile device 102 configured to determine whether a particular mobile device behavior, software application, or process is malicious/performance-degrading, suspicious, or benign. In the example illustrated in FIG. 2B, the mobile device 102 includes a behavior observer module 222, a behavior analyzer module 224, an execution context inference module 226, and an actuator module 228.

Each of the modules 222-228 may be implemented in software, hardware, or any combination thereof. In various implementations, the modules 222-228 may be implemented within parts of the operating system (e.g., within the kernel, in the kernel space, in the user space, etc.), within separate programs or applications, in specialized hardware buffers or processors, or any combination thereof. In an implementation, one or more of the modules 222-228 may be implemented as software instructions executing on one or more processors of the mobile device 102.

The behavior observer module 222 may be configured to instrument or coordinate application programming interfaces (APIs) at various levels/modules of the mobile device. The behavior observer module 222 may be further configured to monitor/observe mobile device operations and events (e.g., system events, execution session context changes, etc.) at the various levels/modules over a period of time via the instrumented APIs, collect information pertaining to the observed operations/events, intelligently filter the collected information, generate one or more observations based, at least in part, on the filtered information, and store the generated observations in a memory (e.g., in a log file, etc.) and/or send (e.g., via memory writes, function calls, etc.) the generated observations to the behavior analyzer module 224.

The behavior observer module 222 may monitor/observe mobile device operations and events by collecting information pertaining to library application programming interface (API) calls in an application framework or run-time libraries, system call APIs, file-system and networking subsystem operations, device (including sensor devices) execution session context changes, and other similar events. The behavior observer module 222 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 222 may also monitor data network activity, which may include types of connections, protocols, port numbers, server/client that the device is connected to, the number of connections, volume or frequency of communications, etc. The behavior observer module 222 may monitor phone network activity, which may include monitoring the type and number of calls or messages (e.g., SMS, etc.) sent out, received, or intercepted (e.g., the number of premium calls placed).

The behavior observer module 222 may also monitor the system resource usage, which may include monitoring the number of forks, memory access operations, number of files open, etc. The behavior observer module 222 may monitor the execution session context of the mobile device, which may include monitoring various factors, such as whether the display is on or off, whether the device is locked or unlocked, the amount of battery remaining, the execution session context of the camera, etc. The behavior observer module 222 may also monitor inter-process communications (IPC) by, for example, monitoring intents to crucial services (browser, contracts provider, etc.), the degree of inter-process communications, pop-up windows, etc.

The behavior observer module 222 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 222 may also monitor/observe one or more hardware counters that denote the execution session context or status of the mobile computing device and/or mobile device sub-systems. A hardware counter may include a special-purpose register of the processors/cores that is configured to store a count or execution session context of hardware-related activities or events occurring in the mobile computing device.

The behavior observer module 222 may also monitor/observe actions or operations of software applications, software downloads from an application download server (e.g., Apple® App Store server), mobile device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 222 may monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 222 may monitor/observe usage of and updates/changes to compass information, mobile device settings, battery life, gyroscope information, pressure sensors, magnet sensors, screen activity, etc. The behavior observer module 222 may monitor/observe notifications communicated to and from a software application (AppNotifications), application updates, etc. The behavior observer module 222 may monitor/observe conditions or events pertaining to a first software application requesting the downloading and/or install of a second software application. The behavior observer module 222 may monitor/observe conditions or events pertaining to user verification, such as the entry of a password, etc.

The behavior observer module 222 may be configured to monitor/observe any of the mobile device behaviors over a period of time. These observations may be for a set period of time or may be cumulative, such as in a continuous learning process. Thus, the longer that the mobile device operates, the more behavioral observations may be collected.

The behavior observer module 222 may also monitor/observe conditions or events at multiple levels of the mobile device, including the application level, radio level, and sensor level. Application level observations may include observing the user via facial recognition software, observing social streams, observing notes entered by the user, observing events pertaining to the use of PassBook/Google Wallet/Paypal/etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of user interaction with the mobile device before establishing radio communication links or transmitting information, dual/multiple subscriber identification module (SIM) cards, Internet radio, mobile phone tethering, offloading data for computations, device execution session context communications, the use as a game controller or home controller, vehicle communications, mobile device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m) communications. Radio level observations may further include monitoring network traffic usage, statistics, or profiles.

Sensor level observations may include monitoring a magnet sensor or other sensor to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user).

Other examples of sensor level observations related to usage or external environments may include, detecting NFC signaling, collecting information from a credit card scanner, barcode scanner, or mobile tag reader, detecting the presence of a Universal Serial Bus (USB) power charging source, detecting that a keyboard or auxiliary device has been coupled to the mobile device, detecting that the mobile device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal execution session context of the mobile device, etc.

To reduce the number of factors monitored to a manageable level, in an implementation, the behavior observer module 222 may perform coarse observations by monitoring/observing an initial set of behaviors or factors that are a small subset of all factors that could contribute to the mobile device's degradation. In an implementation, the behavior observer module 222 may receive the initial set of behaviors and/or factors from a server module and/or a component in a cloud service or network. In an implementation, the initial set of behaviors/factors may be specified in classifier models.

Each classifier model may be a behavior model that includes data and/or information structures (e.g., feature vectors, behavior vectors, component lists, etc.) that may be used by a mobile device processor to evaluate a specific feature or implementation of a mobile device's behavior. Each classifier model may also include decision criteria for monitoring a number of features, factors, data points, entries, APIs, execution session contexts, conditions, behaviors, applications, processes, operations, components, etc. (herein collectively "features") in the mobile device. The classifier models may be preinstalled on the mobile device, downloaded, or received from a network server, generated in the mobile device, or any combination thereof. The classifier models may be generated by using crowd sourcing solutions, behavior modeling techniques, machine learning algorithms, etc.

Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes/tests only the features/entries that are most relevant for determining whether a particular mobile device behavior is benign or not benign (e.g., malicious or performance-degrading).

A locally generated lean classifier model is a lean classifier model that is generated in the mobile device. An application-based classifier model may be an application specific classifier model or an application-type specific classifier model. An application specific classifier model is a classifier model that includes a focused data model that includes/tests only the features/entries that are most relevant for determining whether a particular software application is benign or not benign (e.g., malicious or performance-degrading). An application-type specific classifier model is a classifier model that includes a focused data model that includes/tests only the features/entries that are most relevant for determining whether a particular type of software application is benign or not benign (e.g., malicious or performance-degrading). A device-specific classifier model is a classifier model that includes a focused data model that includes/tests only mobile device-specific features/entries that are determined to be most relevant to classifying a behavior in a specific mobile device. A device-type-specific classifier model is a classifier model that includes a focused data model that includes/tests only the features/entries that are most relevant to classifying a behavior in a specific type of mobile device (e.g., same manufacturer, model, configuration, etc.).

In an implementation, the behavior analyzer module 224 may receive the observations from the behavior observer module 222, and compare the received information (i.e., observations) and execution context inference module 226. The behavior analyzer module 224 then apply classifier modules to the received information to identify subsystems, processes, and/or applications associated with the received observations that are contributing to (or are likely to contribute to) the device's degradation over time, or which may otherwise cause problems on the device.

In an implementation, the behavior analyzer module 224 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 224 may be configured to analyze information (e.g., in the form of observations) collected from various modules (e.g., the behavior observer module 222, execution context inference module 226, etc.), learn the normal operational behaviors of the mobile device, and generate one or more behavior vectors based the results of the comparisons. The behavior analyzer module 224 may also apply the behavior vectors to classifier modules to determine whether a particular mobile device behavior, software application, or process is performance-degrading/malicious, benign, or suspicious.

When the behavior analyzer module 224 determines that a behavior, software application, or process is malicious or performance-degrading, the behavior analyzer module 224 may notify the actuator module 228. The actuator module 228 may perform various actions or operations to correct mobile device behaviors determined to be malicious or performance-degrading and/or perform operations to heal, cure, isolate, or otherwise fix the identified problem.

When the behavior analyzer module 224 determines that a behavior, software application, or process is suspicious, the behavior analyzer module 224 may notify the behavior observer module 222. The behavior observer module 222 may adjust the granularity of its observations (i.e., the level of detail at which mobile device behaviors are observed) and/or change the behaviors that are observed based, at least in part, on information received from the behavior analyzer module 224 (e.g., results of the real-time analysis operations), generate or collect new or additional behavior information, and send the new/additional information to the behavior analyzer module 224 for further analysis/classification. Such feedback communications between the behavior observer module 222 and the behavior analyzer module 224 enable the mobile device 102 to recursively increase the granularity of the observations (i.e., make finer or more detailed observations) or change the features/behaviors that are observed until a source of a suspicious or performance-degrading mobile device behavior is identified, until a processing or battery consumption threshold is reached, or until the mobile device processor determines that the source of the suspicious or performance-degrading mobile device behavior cannot be identified from further increases in observation granularity. Such feedback communication also enable the mobile device 102 to adjust or modify the classifier models locally in the mobile device without consuming an excessive amount of the mobile device's processing, memory, or energy resources.

In an implementation, the behavior observer module 222 and the behavior analyzer module 224 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the behavior observer module 222 enables the mobile computing device 102 to efficiently identify and prevent problems from occurring on mobile computing devices without requiring a large amount of processor, memory, or battery resources on the device.

In various implementations, the behavior observer module 222 and/or the behavior analyzer module 224 may be configured to analyze mobile device behaviors by identifying a critical data resource that requires close monitoring, identifying an intermediate resource associated with the critical data resource, monitoring API calls made by a software application when accessing the critical data resource and the intermediate resource, identifying mobile device resources that are consumed or produced by the API calls, identifying a pattern of API calls as being indicative of malicious activity by the software application, generating a light-weight behavior signature based, at least in part, on the identified pattern of API calls and the identified mobile device resources, using the light-weight behavior signature to perform behavior analysis operations, and determining whether the software application is malicious or benign based, at least in part, on the behavior analysis operations.

In various implementations, the behavior observer module 222 and/or the behavior analyzer module 224 may be configured to analyze mobile device behaviors by identifying APIs that are used most frequently by software applications executing on the mobile device, storing information regarding usage of identified hot APIs in an API log in a memory of the mobile device, and performing behavior analysis operations based, at least in part, on the information stored in the API log to identify mobile device behaviors that are inconsistent with normal operation patterns. In an implementation, the API log may be generated so that it is organized such that the values of generic fields that remain the same across invocations of an API are stored in a separate table as the values of specific fields that are specific to each invocation of the API. The API log may also be generated so that the values of the specific fields are stored in a table along with hash keys to the separate table that stores the values of the generic fields.

In various implementations, the behavior observer module 222 and/or the behavior analyzer module 224 may be configured to analyze mobile device behaviors by receiving a full classifier model that includes a finite execution session context machine that is suitable for conversion or expression as a plurality of boosted decision stumps, generating a lean classifier model in the mobile device based, at least in part, on the full classifier, and using the lean classifier model in the mobile device to classify a behavior of the mobile device as being either benign or not benign (i.e., malicious, performance degrading, etc.). In an implementation, generating the lean classifier model based, at least in part, on the full classifier model may include determining a number of unique test conditions that should be evaluated to classify a mobile device behavior without consuming an excessive amount of processing, memory, or energy resources of the mobile device, generating a list of test conditions by sequentially traversing the list of boosted decision stumps and inserting the test condition associated with each sequentially traversed boosted decision stump into the list of test conditions until the list of test conditions may include the determined number of unique test conditions, and generating the lean classifier model to include only those boosted decision stumps that test one of a plurality of test conditions included in the generated list of test conditions.

In various implementations, the behavior observer module 222 and/or the behavior analyzer module 224 may be configured to use device-specific information (e.g., capability and execution session context information) of the mobile device to identify mobile device-specific test conditions in a plurality of test conditions that are relevant to classifying a behavior of the mobile device. The behavior observer module 222 and/or the behavior analyzer module 224 may generate a lean classifier model that includes only the identified mobile device-specific test conditions, and use the generated lean classifier model in the mobile device to classify the behavior of the mobile device. In an implementation, the lean classifier model may be generated to include only decision nodes that evaluate a mobile device feature that is relevant to a current operating execution session context or configuration of the mobile device. In a further implementation, generating the lean classifier model may include determining a number of unique test conditions that should be evaluated to classify the behavior without consuming an excessive amount of mobile device's resources (e.g., processing, memory, or energy resources), generating a list of test conditions by sequentially traversing the plurality of test conditions in the full classifier model, inserting those test conditions that are relevant to classifying the behavior of the mobile device into the list of test conditions until the list of test conditions includes the determined number of unique test conditions, and generating the lean classifier model to include decision nodes included in the full classifier model that test one of the conditions included in the generated list of test conditions.

In various implementations, the behavior observer module 222 and/or the behavior analyzer module 224 may be configured to recognize mobile device behaviors that are inconsistent with normal operation patterns of the mobile device. The behavior observer module 222 and/or the behavior analyzer module 224 may do so by monitoring an activity of a software application or process, determining an operating system execution session context of the software application/process, and determining whether the activity is benign based, at least in part, on the activity and/or the operating system execution session context of the software application or process during which the activity was monitored. In an further implementation, the behavior observer module 222 and/or the behavior analyzer module 224 may determine whether the operating system execution session context of the software application or process is relevant to the activity, generate a shadow feature value that identifies the operating system execution session context of the software application or process during which the activity was monitored, generate a behavior vector that associates the activity with the shadow feature value identifying the operating system execution session context, and use the behavior vector to determine whether the activity is benign, suspicious, or not benign (i.e., malicious or performance-degrading).

In various implementations, the behavior observer module 222 and/or the behavior analyzer module 224 may be configured to recognize mobile device behaviors that are inconsistent with normal operation patterns of the mobile device by monitoring an activity of a software application or process, determining an application-and-operating-system-agnostic execution session context of the software application/process, and determining whether the activity is benign based, at least in part, on the activity and/or the application-and-operating-system-agnostic execution session context of the software application during which the activity was monitored.

In an further implementation, the behavior observer module 222 and/or the behavior analyzer module 224 may determine whether the application-and-operating-system-agnostic execution session context of the software application is relevant to the activity, and generate a behavior vector that associates the activity with the application-and-operating-system-agnostic execution session context, and use the behavior vector to determine whether the activity is benign, suspicious, or not benign (i.e., malicious or performance-degrading). The mobile device may also use the application-and-operating-system-agnostic execution session context to select a classifier model (e.g., application-specific classifier model), and apply the behavior vector to the selected classifier model to determine whether a mobile device behavior is inconsistent with normal operation patterns of the mobile device.

In various implementations, the mobile device 102 may be configured to work in conjunction with a network server to intelligently and efficiently identify the features, factors, and data points that are most relevant to determining whether a mobile device behavior is benign or not benign (e.g., malicious or performance-degrading). For example, the mobile device 102 may be configured to receive a full classifier model from the network server, and use the received full classifier model to generate lean classifier models (i.e., data/behavior models) that are specific for the features and functionalities of the mobile device or the software applications of the mobile device.

In an implementation, the mobile device 102 may be configured to use the full classifier model to generate a family of lean classifier models of varying levels of complexity (or "leanness"). The leanest family of lean classifier models (i.e., the lean classifier model based, at least in part, on the fewest number of test conditions) may be applied routinely until a behavior is encountered that the model cannot categorize as either benign or malicious (and therefore is categorized by the model as suspicious), at which time a more robust (i.e., less lean) lean classifier model may be applied in an attempt to categorize the behavior as either benign or malicious. The application of ever more robust lean classifier models within the family of generated lean classifier models may be applied until a definitive classification of the behavior is achieved. In this manner, the observer and/or analyzer modules can strike a balance between efficiency and accuracy by limiting the use of the most complete, but resource-intensive lean classifier models to those situations where a robust classifier model is needed to definitively classify a behavior.

In various implementations, the mobile device 102 may be configured to generate one or more lean classifier models by converting a finite execution session context machine representation/expression into boosted decision stumps, pruning or culling the full set of boosted decision stumps based, at least in part, on mobile device-specific execution session contexts, features, behaviors, conditions, or configurations to include subset or subsets of boosted decision stumps included in the full classifier model, and using the subset or subsets of boosted decision stumps to intelligently monitor, analyze and/or classify a mobile device behavior.

Boosted decision stumps are one level decision trees that have exactly one node (and thus one test question or test condition) and a weight value, and thus are well suited for use in a binary classification of data/behaviors. That is, applying a behavior vector to boosted decision stump results in a binary answer (e.g., Yes or No). For example, if the question/condition tested by a boosted decision stump is "is the frequency of Short Message Service (SMS) transmissions less than x per minute," applying a value of "3" to the boosted decision stump will result in either a "yes" answer (for "less than 3" SMS transmissions) or a "no" answer (for "3 or more" SMS transmissions).

Boosted decision stumps are efficient because they are very simple and primal (and thus do not require significant processing resources). Boosted decision stumps are also very parallelizable, and thus many stumps may be applied or tested in parallel/at the same time (e.g., by multiple cores or processors in the mobile device).

In an implementation, the mobile device 102 may be configured to generate a lean classifier model that includes a subset of classifier criteria included in the full classifier model and only those classifier criteria corresponding to the features relevant to the mobile device configuration, functionality, and connected/included hardware. The mobile device 102 may use this lean classifier model(s) to monitor only those features and functions present or relevant to the device. The mobile device may then periodically modify or regenerate the lean classifier model(s) to include or remove various features and corresponding classifier criteria based, at least in part, on the mobile device's current execution session context and configuration.

As an example, the behavior analyzer module 224 may be configured to receive a large boosted decision stumps classifier model with decision stumps associated with a full feature set of behavior models (e.g., classifiers), and the behavior analyzer module 224 may derive one or more lean classifier models from the large classifier models by selecting only features from the large classifier model(s) that are relevant the mobile device's current configuration, functionality, operating execution session context and/or connected/included hardware, and including in the lean classifier model a subset of boosted decision stumps that correspond to the selected features. In this implementation, the classifier criteria corresponding to features relevant to the mobile device may be those boosted decision stumps included in the large classifier model that test at least one of the selected features. The behavior analyzer module 224 may then periodically modify or regenerate the boosted decision stumps lean classifier model(s) to include or remove various features based, at least in part, on the mobile device's current execution session context and configuration so that the lean classifier model continues to include application-specific or device-specific feature boosted decision stumps.

In addition, the mobile device 102 may also dynamically generate application-specific and/or application-type specific classifier models that identify conditions or features that are relevant to a specific software application (Google® wallet) and/or to a specific type of software application (e.g., games, navigation, financial, news, productivity, etc.). In an implementation, these application-based classifier models (i.e., the application-specific and application-type specific classifier models) may be generated to include a reduced and more focused subset of the decision nodes that are included in the received full classifier model or of those included in lean classifier model generated from the received full classifier model.

In various implementations, the mobile device 102 may be configured to generate application-based classifier models for each software application in the system and/or for each type of software application in the system. The mobile device 102 may also be configured to dynamically identify the software applications and/or application types that are a high risk or susceptible to abuse (e.g., financial applications, point-of-sale applications, biometric sensor applications, etc.), and generate application-based classifier models for only the software applications and/or application types that are identified as being high risk or susceptible to abuse. In various implementations, the mobile device 102 may be configured to generate the application-based classifier models dynamically, reactively, proactively, and/or every time a new application is installed or updated.

In an implementation, the mobile device 102 may be configured to use or apply multiple classifier models in parallel. In various implementations, the mobile device 102 may be configured to give preference or priority to the results generated from using or applying the application-based classifier models to a behavior/feature vector over the results generated from using/applying a more generic and locally generated lean classifier model to the same or different behavior/feature vector when evaluating a specific software application. In the various implementations, the mobile device 102 may use the results of applying the classifier models to predict whether a software application, process, or complex mobile device behavior is benign or contributing to the degradation of the performance or power consumption characteristics of the mobile device.

As mentioned above, each software application generally performs a number of tasks or activities on the mobile device, and the specific execution session context in which certain tasks/activities are performed in the mobile device may be a strong indicator of whether a mobile device behavior merits additional or closer scrutiny, monitoring and/or analysis. As such, in the various implementations, a processor of the mobile device 102 may be configured with processor-executable instructions to use information identifying the execution session contexts in which certain tasks/activities are performed to focus its behavioral monitoring and analysis operations and better determine whether a mobile device behavior is benign, suspicious, or malicious/performance-degrading.

In various implementations, the behavior observer module 222 and/or the behavior analyzer module 224 may be configured to associate the activities/tasks performed by a software application with the execution session contexts in which those activities/tasks were performed. For example, the observer module may be configured to generate a behavior vector that includes the behavior information collected from monitoring the instrumented components in a sub-vector or data-structure that lists the features, activities, or operations of the software for which the execution session context is relevant (e.g., location access, SMS read operations, sensor access, etc.). In an implementation, this sub-vector/data-structure may be stored in association with a shadow feature value sub-vector/data-structure that identifies the execution session context in which each feature/activity/operation was observed. As an example, the observer module may generate a behavior vector that includes a "location_background" data field whose value identifies the number or rate that the software application accessed location information when it was operating in a background execution session context. This allows the execution context inference module 226 and/or the behavior analyzer module to analyze this execution session context information independent of and/or in parallel with the other observed behaviors of the mobile device. Generating the behavior vector in this manner also allows the system to aggregate information (e.g., frequency or rate) over time.

In various implementations, the execution context inference module 226 and/or the behavior analyzer module 224 may be configured to generate the behavior vectors to include a concise definition of the observed behaviors. The behavior vector may succinctly describe an observed behavior of the mobile device, software application, or process in a value or vector data-structure (e.g., in the form of a string of numbers, etc.). Each value may be a discrete representation of a behavior such as 1/0 indicating whether a task was launched by a user, or whether a task is operating in the foreground. Similarly, behaviors may also be described by weighted values for behaviors are more easily expressed along a continuum. For example, the duration of time since the last user interaction may be a base value indicating that a user interaction did take place (e.g., the software application is not operating autonomously), and may be weighted by a multiplier indicating the length of time since the last user interaction (e.g., "0.1"=1 minute or less . . . "0.8"=eight minutes or more). In this way, behaviors may be described in a variety of terms, as best suited to the behavior characteristics.

The behavior vector may also function as an identifier that enables the mobile device system to quickly recognize, identify, and/or analyze mobile device behaviors. In the various implementations, the observer and/or analyzer modules may be configured to generate the behavior vectors to include series of numbers, each of which signifies a feature or a behavior of the mobile device. For example, numbers included in the behavior vector may signify whether a camera of the mobile device is in use (e.g., as zero or one), how much network traffic has been transmitted from or generated by the mobile device (e.g., 20 KB/sec, etc.), how many internet messages have been communicated (e.g., number of SMS messages, etc.), etc. In a further example, the behavior vector may indicate that the camera was used 5 times in 3 seconds by a background process, that the camera was used 3 times in 3 seconds by a foreground process, or that the camera was used as part of an independent feature.

Figure 3:
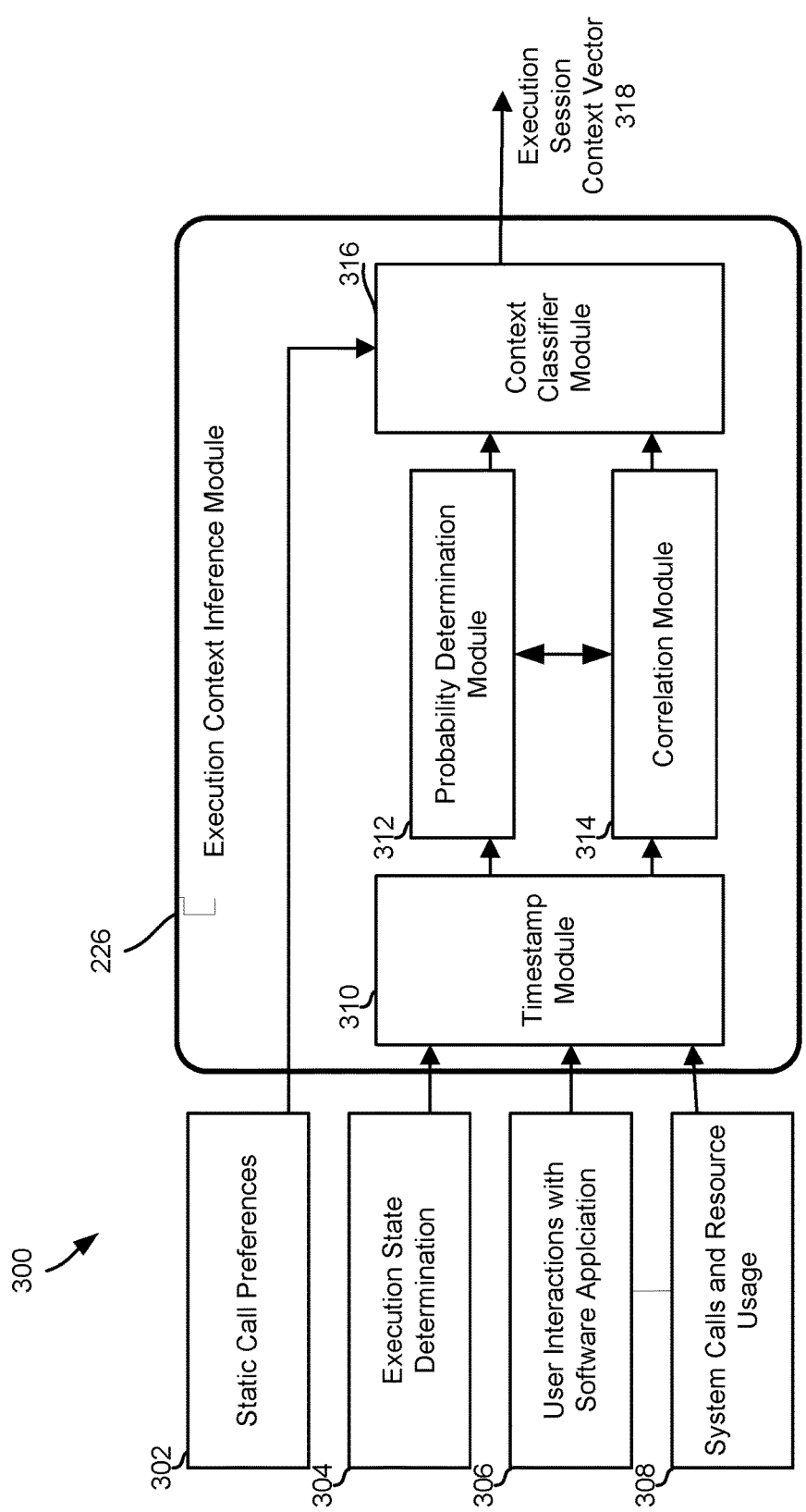
FIG. 3 is a block diagram illustrating logical components and information flows in an execution context inference module of a mobile device configured to determine the execution session context in which a software application executes on the device.

FIG. 3 illustrates logical components and information flows in a computing component 300 (e.g., a component of mobile device 600, or SOC 100) implementing machine learning techniques to infer execution session context for a software application. In the example illustrated in FIG. 3, the computing component 300 includes an execution context inference module 226 and several sub-modules.

The execution context inference module 226 provides a mechanism for system software to independently determine the context within which an application executes tasks/activities based upon device behavior and user interaction. In particular, the execution context inference module 226 may receive as input an execution state determination 304 (e.g., foreground or background). The execution context inference module 226 may also receive as input a static call preferences 302, the system calls and resource usage 308, and both direct and indirect user interactions with software application 306. By applying machine learning techniques to information received from the behavior observer module 222 (e.g., 302-308) the execution context inference module 226 may determine what resources the software application is consuming, how often a user has interacted with the application, and the execution state (e.g., foreground or background) in which the application operates.

A timestamp module 310 may receive the execution state determination 304, the user interactions with the software application 306, and the system calls and resource usage 308 information. The timestamp module 310 may, via an internal system clock and the processor of the mobile device, (e.g., SOC 100) update or insert a timestamp associated with the occurrence of the task/activity to stored entry for the task/activity (e.g., such as by altering a packet header of a received data packet). Time stamping of static calls may be unnecessary, however accurate tracking of behavior times may enable the execution context inference module 226 to determine whether activities are ongoing or have lapsed into inactive states.

The timestamp module 310 may pass the updated behavior information to the probability determination module 312 and the correlation module 314. The correlation module 314 may, via the processor of the mobile device (e.g., SOC 100), correlate the received behavior information. The correlation module 314 may check the timestamp of a piece of behavior information and may compare it to other incoming or recently received pieces of behavior information. The time of execution state changes, user interactions (indirectly and directly), and system calls and resource usage may be correlated, and links between concurrent or nearly concurrent events (referred to herein as correlation information) may be stored in memory. For example, the change of an execution state from "foreground" to "background" nearly concurrent to a user's tapping on the touchscreen interface, may be logged as a potentially correlated set of behaviors (i.e., the behaviors are interrelated). In various implementations, correlation information resulting from correlating such system activities with user activities may be stored in memory in the same data structure with the initially stored, or time stamped information.

The correlation information resulting from correlating system activities with user activities may include software application behaviors or activities identified as having matching, concurrent, or semi-concurrent time stamps with time stamps of user activities (e.g., interactions with an input device). This correlation information may be forwarded to the probability determination module 312 for a determination of the correlation information's impact on the probability that software application is operating as intended by a user. In various implementations, the correlation module 312 may calculate a correlation value (e.g., a percentage correlation) representing the degree to which timestamps of software application behaviors/activities match up with timestamps of observed user activities. For example, the correlation module may access a stored timestamp range representing the minimum and maximum timestamp differential that may be associated with software application behaviors/activities and/or observed user interactions/activities. Software application behaviors/activities and user activities having timestamps with a minimum differential may be highly correlated (e.g., assigned a 90% correlation value). Conversely, software application behaviors/activities occurring at times well separated from user activities (i.e., the respective timestamps differ by some threshold) may be loosely correlated (e.g., assigned a 15% correlation value). Thus, in some embodiments, the correlation information forward to the probability determination module 312 may include one or more of the actual software application behaviors/activities deemed to correlate with observed user activities, their respective timestamps, and a numerical approximation of a degree of correlation between the software application behaviors/activities and user activities.

The correlation module 314 may send correlation information to the probability determination module 312. The probability determination module 312 may, via the processor of the mobile device (e.g., SOC 100), calculate the conditional probabilities associated with different behaviors. Behavior information and the correlation information may be used to calculate the probability that an execution state change actually occurred, that a user actually interacted with the application as opposed to bumping the touchscreen, etc. Returning to the above example, the probability determination module 312 may calculate the probability that the user actually engaged the transition of execution state from the "foreground" to the "background". Various implementations may apply probabilistic techniques to determine numerical approximations of behavior probabilities. For example, the probability determination module 312 may review the behavior information of software application behaviors or activities identified by the correlation module 314 as matching some user activity or activities (e.g., having a timestamp differential within an acceptable range or threshold). The probability determination module 312 may use this information along with any correlation values to calculate a probability that the system behaviors/activities were intentional and thus the end result of an application moving from the foreground to the background was intentionally initiated by a user.

In various implementations, the probability determination module 312 may, in parallel with the correlation module 314, pass a modified behavior vector (i.e., behavior vector upon which correlation and or probability determination calculations have been executed) to the machine learning module 316, and system call preferences 302. The machine learning module 316, may take as input system call preferences 302, conditional probabilities of various events, in the form of a modified behavior vector received from the probability determination module 312, and correlations of sequences of events, in the form of a second behavior vector received from the correlation module 314. The machine learning module 316 may, via the processor of the mobile device (e.g., SOC 100), perform a temporal sequence analysis on the received behavior vectors (i.e., the values contained therein). For example, the machine learning module 316 may implement a trained Markov model or a recurrent neural network model to analyze the received behavior vectors. As another example, the machine learning module 316 may compare the observed sequence to previously trained sequence templates using techniques such as Dynamic time warping, longest common subsequence algorithm, etc.

In the various implementations, the result of the machine learning module 316 analysis may be a single behavior vector or matrix (i.e., execution session context vector 318). This vector or matrix may be the execution session context vector 318 describing the context within with the software application performs tasks/activities as defined by the analyzed behaviors. Execution session context vectors may be used to select application classifier models relevant to the software application. The execution session context vector may further be used in comparison to the application classifier model in order to determine whether the application is malicious or benign.

Figure 4:
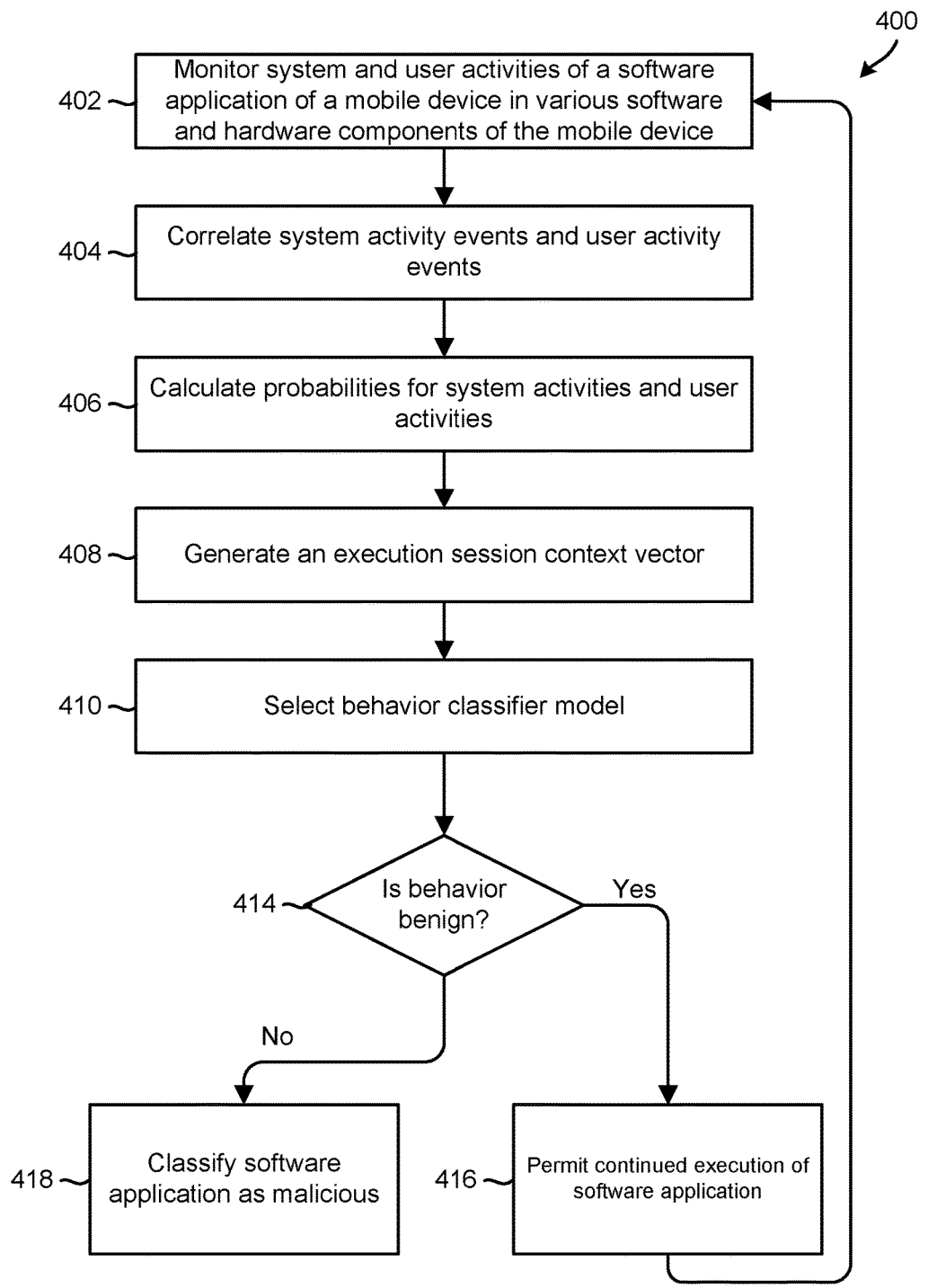
FIG. 4 is a process flow diagram illustrating a method of determining execution session context of an executing software application in order to determine whether a mobile device behavior is malignant or benign.

FIG. 4 illustrates process flows of a method 400 for inferring execution session context of a software application. The various implementations and embodiments of method 400 may be carried out using mobile devices and device processors (e.g. SOC 100, mobile device 600). The mobile device may apply machine learning techniques to collected behavior information associated with system and user activities of a software application in order to determine the context in which the software device executes.

In block 402, the processor of the mobile device (e.g., SOC 100, mobile device 600) may monitor the system activities and user activities of a software application executing on the mobile device. The mobile device may monitor the hardware and software components of the mobile device in order to collect behavior information about the tasks/activities of the software application. User activities may include both direct engagements by the user with the application, such as by a user interface of the software application, or through mobile device inputs while the application is running in the foreground. Alternatively, user interactions may be indirect, such as by checking a notification received from a software application running in the background. User activities may also include whether the user launched the software application and whether the user launched a respective task/activity. System activities may include system calls, resource usage (e.g., battery, memory, processing resources, etc.), and execution state changes/transitions.

In block 404, the processor of the mobile device (e.g., SOC 100, mobile device 600) may correlate the user activities and system activities to determine which activities may be linked. That is the mobile device may determine which activities occurred concurrently or nearly concurrently, so as to indicate that their occurrence may be linked. The result of the correlation may be a modified behavior vector containing correlation values for the task/activities. Alternatively, the output may be scalar representations of correlation.

In block 406, the processor of the mobile device (e.g., SOC 100, mobile device 600) may calculate probabilities for both the user activities and the system activities. The probabilities may be numeric descriptions of the likelihood that the associated behavior actually occurred, or that two events occurred as a result of one another. Like the correlation data, the result of the calculation of probabilities may be a vector or one or more scalar values.

In block 408, the processor of the mobile device (e.g., SOC 100, mobile device 600) may generate an execution session context vector by applying machine learning techniques to the result of the correlation and the probability calculations. The generation of the execution session context vector may further include the use of system activities including static call dependencies and preferences in applying the machine learning techniques. The result may be a single vector or matrix. The execution session context vector may be a behavior vector whose included values reflect the context within which the associated behaviors occur during software execution In block 410, the processor of the mobile device (e.g., SOC 100, mobile device 600) may use the execution session context vector to select an appropriate classifier model, such as a behavior classifier model. In various implementations, the behavior classifier model may be application specific, or application-type specific. In various implementations, the behavior classifier model may be selected by identifying mobile device features used by the software application or process and selecting the behavior classifier model to include the identified features.

In determination block 414, the processor of the mobile device (e.g., SOC 100, mobile device 600) may determine whether the software application is benign. In response to determining, based, at least in part, on the comparison of the execution session context vector to the application classifier model, that the software application is benign (i.e., block 414="Yes"), the processor may allow the software application to continue execution in block 416. The processor of the mobile device may continue monitoring the software application for further suspicious behaviors in block 402.

In response to determining that the software application is malicious (i.e., block 414="No"), the mobile device may terminate the software application in block 416. In various embodiments, the software application may be prevented from executing again if the application is found to be malicious.

Figure 5:
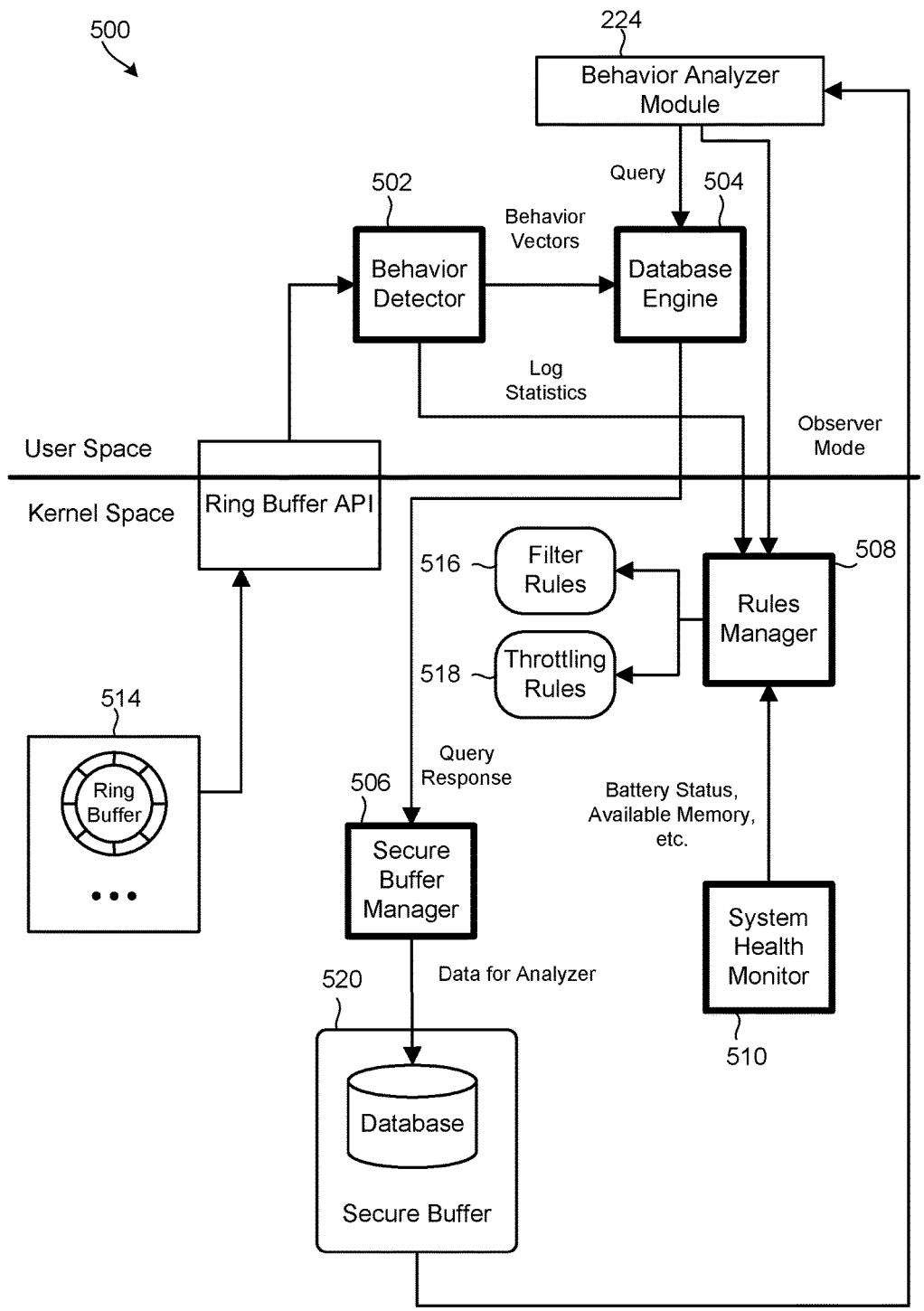
FIG. 5 is a component block diagram illustrating logical components and information flows in a computing system implementing observer modules and observer daemons in accordance with the various embodiments.

FIG. 5 illustrates logical components and information flows in a computing system 500 implementing an observer daemon. In the example illustrated in FIG. 5, the computing system 500 includes a behavior detector 502, a database engine 504, and a behavior analyzer 224 in the user space, and a ring buffer 514, a filter rules module 516, a throttling rules module 518, and a secure buffer 520 in the kernel space. The computing system 500 may further include an observer daemon that includes the behavior detector 502 and the database engine 504 in the user space, and the secure buffer manager 506, the rules manager 508, and the system health monitor 510 in the kernel space.

The various implementations may provide cross-layer observations on mobile devices encompassing webkit, SDK, NDK, kernel, drivers, and hardware in order to characterize system behavior. The behavior observations may be made in real time.

Figure 6:
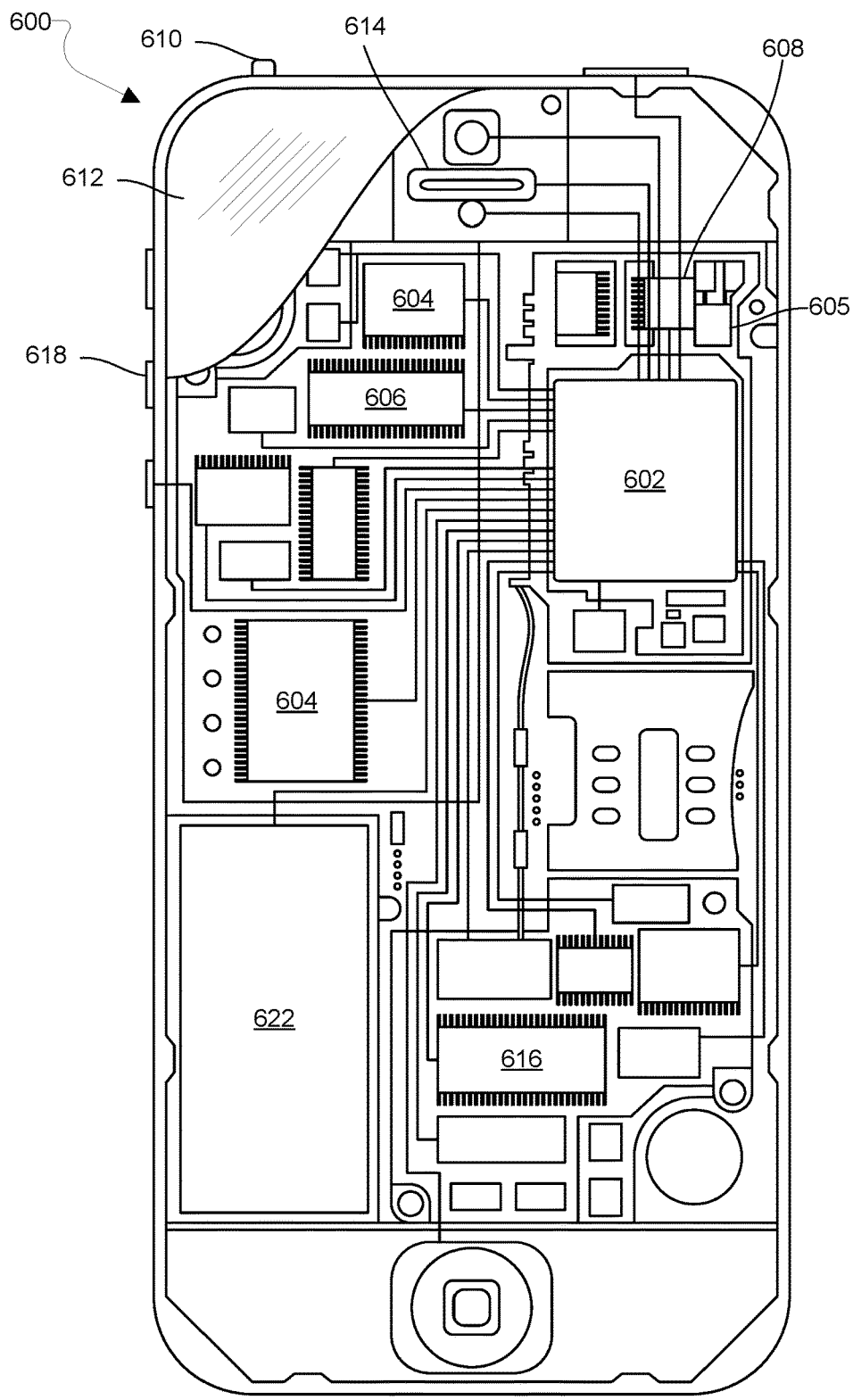
FIG. 6 is a component block diagram of an example mobile device suitable for use with the various embodiments.

The various implementations may be implemented on a variety of mobile computing devices, an example of which is illustrated in FIG. 6 in the form of a smartphone 600. The smartphone 600 may include a processor 602 coupled to a touchscreen controller 604 and an internal memory 606. The processor 602 may be one or more multicore ICs designated for general or specific processing tasks. The internal memory 606 may be volatile or non-volatile memory, and may also be secure and/or encrypted memory, or unsecure and/or unencrypted memory, or any combination thereof. The touchscreen controller 604 and the processor 602 may also be coupled to a touchscreen panel 612, such as a resistive-sensing touchscreen, capacitive-sensing touchscreen, infrared sensing touchscreen, etc.

The smartphone 600 may have one or more radio signal transceivers 608 (e.g., Peanut®, Bluetooth®, Zigbee®, Wi-Fi, radio frequency radio) and antennae 610, for sending and receiving, coupled to each other and/or to the processor 602. The transceivers 608 and antennae 610 may be used with the above-mentioned circuitry to implement the various wireless transmission protocol stacks and interfaces. The processor 602 of the multicore device 600 may be coupled to a cellular network wireless modem chip 616 that enables communications via a cellular network. Smartphones 600 typically also include a speaker 614 and menu selection buttons or rocker switches 618 for receiving user inputs.

A typical smartphone 600 also includes a sound encoding/decoding (CODEC) circuit 622, which digitizes sound received from a microphone into data packets suitable for wireless transmission and decodes received sound data packets to generate analog signals that are provided to the speaker to generate sound. Also, one or more of the processor 602, wireless transceiver 605, and CODEC 622 may include a digital signal processor (DSP) circuit (not shown separately).

Figure 7:
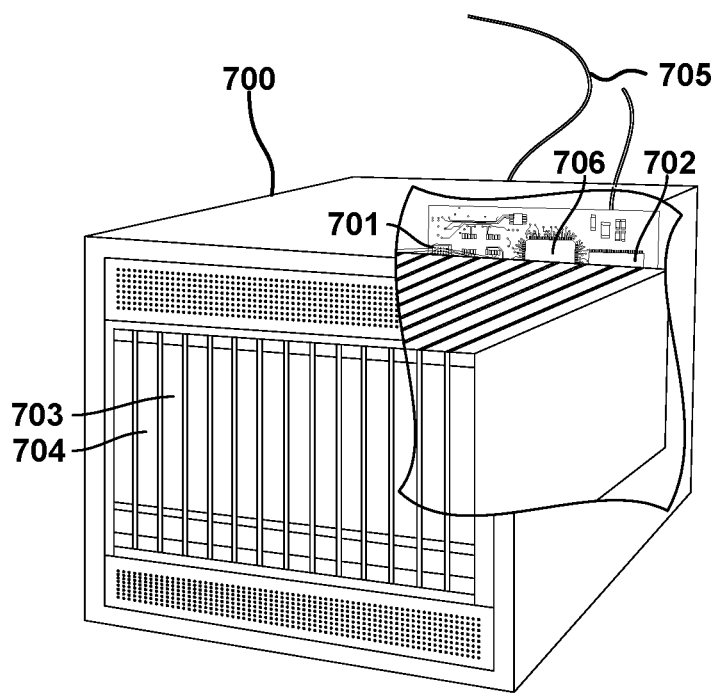
FIG. 7 is a component block diagram of an example server computer suitable for use with the various embodiments.

Portions of the implementation methods may be accomplished in a client-server architecture with some of the processing occurring in a server, such as maintaining databases of normal operational behaviors, which may be accessed by a mobile device processor while executing the implementation methods. Such implementations may be implemented on any of a variety of commercially available server devices, such as the server 700 illustrated in FIG. 7. Such a server 700 typically includes a processor 701 coupled to volatile memory 702 and a large capacity nonvolatile memory, such as a disk drive 703. The server 700 may also include a floppy disc drive, compact disc (CD) or digital versatile disc (DVD) disc drive 704 coupled to the processor 701. The server 700 may also include network access ports 706 coupled to the processor 701 for establishing data connections with a network 705, such as a local area network coupled to other broadcast system computers and servers.

The processors 602, 701 may be any programmable microprocessor, microcomputer or multiple processor chip or chips that can be configured by software instructions (applications) to perform a variety of functions, including the functions of the various implementations described below. In some mobile devices, multiple processors 602 may be provided, such as one processor dedicated to wireless communication functions and one processor dedicated to running other applications. Typically, software applications may be stored in the internal memory 606, 702, 703 before they are accessed and loaded into the processor 602, 701. The processor 602, 701 may include internal memory sufficient to store the application software instructions.

The term "performance degradation" is used in this application to refer to a wide variety of undesirable mobile device operations and characteristics, such as longer processing times, slower real time responsiveness, lower battery life, loss of private data, malicious economic activity (e.g., sending unauthorized premium SMS message), denial of service (DoS), operations relating to commandeering the mobile device or utilizing the phone for spying or botnet activities, etc.

Generally, a behavior vector may be a one-dimensional array, an n-dimensional array of numerical features, an ordered list of events, a feature vector, a numerical representation of one or more objects, conditions or events, an execution session context machine, etc. In an implementation, the behavior vector may include one or more behaviors. In various implementations, a behavior may be represented as a number value or a structure that stores number values (e.g., vector, list, array, etc.).

Computer program code or "code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used herein refer to machine language code (such as object code) whose format is understandable by a processor.

Computing devices may include an operating system kernel that is organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components discussed in this application may be implemented in either the kernel space or the user space, unless expressly execution session context otherwise.

As used in this application, the terms "component," "module," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core, and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The foregoing method descriptions and the process flow diagrams are provided merely as illustrative examples and are not intended to require or imply that the blocks of the various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or execution session context machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product The preceding description of the disclosed embodiments is provided to enable any person skilled in the art to make or use the claims.

Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of determining whether a software application is malicious based on an execution session context of the software application in a mobile computing device, the method comprising:

monitoring, by a processor of the mobile computing device, user interactions that indirectly engage the software application or process to collect behavior information;

using, by the processor, the collected behavior information to identify an execution state change event, a timestamp associated with the execution state change event, a user activity, and a timestamp associated with the user activity;

generating, by the processor, a correlation value that identifies a degree to which the timestamp associated with the execution state change event matches the timestamp associated with the user activity;

determining, by the processor, a probability value based on the generated correlation value and the collected behavior information;

generating, by the processor, an execution session context vector based on the collected behavior information and the determined probability value; and using a behavior classifier model based on the generated execution session context vector to determine whether the software application is benign.

2. The method of claim 1, wherein using the behavior classifier model based on the generated execution session context vector to determine whether the software application is benign comprises:

selecting, by the processor, the behavior classifier model based on the generated execution session context vector; and using the selected behavior classifier model to determine whether the software application is benign.

3. The method of claim 2, wherein selecting the behavior classifier model based on the generated execution session context vector comprises selecting an application specific classifier model based on the generated execution session context vector.

4. The method of claim 2, wherein selecting the behavior classifier model based on the generated execution session context vector further comprises:

identifying mobile computing device features used by the software application or process; and selecting the behavior classifier model to include the identified features.

5. The method of claim 1, further comprising forwarding the generated execution session context vector to a second software application or process as input.

6. The method of claim 1, wherein using the collected behavior information to identify the execution state change event, the timestamp associated with the execution state change event, the user activity, and the timestamp associated with the user activity comprises:

using the collected behavior information to determine whether the software application or process transitioned from operating in a foreground execution state to operating in a background execution state, or vice versa.

7. The method of claim 1, wherein monitoring the user interactions that indirectly engage the software application or process to collect the behavior information includes monitoring system calls issued by the software application or process to collect the behavior information.

8. The method of claim 1, wherein using the collected behavior information to identify the execution state change event, the timestamp associated with the execution state change event, the user activity, and the timestamp associated with the user activity comprises:

using the collected behavior information to determine whether the software application or process was launched as a result of user interaction with the mobile computing device.

9. The method of claim 1, wherein monitoring the user interactions that indirectly engage the software application or process to collect the behavior information further comprises monitoring user interactions that directly engage with the software application or process to collect the behavior information.

10. The method of claim 1, further comprising:
correlating the system activities and the user activities.

11. The method of claim 1, wherein determining the probability value based on the generated correlation value and the collected behavior information comprises:
determining the probability value based on static call preferences of the software application.

12. A mobile computing device, comprising:
a memory; and
a processor coupled to the memory and configured with processor-executable instructions to:
monitor users interactions that indirectly engage a software application or process to collect behavior information;
use the collected behavior information to identify an execution state change event, a timestamp associated with the execution state change event, a user activity, and a timestamp associated with the user activity;
generate a correlation value that identifies a degree to which the timestamp associated with the execution state change event matches the timestamp associated with the user activity;
determine a probability value based on the generated correlation value and the collected behavior information;
generate an execution session context vector based on the collected behavior information and the determined probability value;
use a behavior classifier model based on the generated execution session context vector to determine whether the software application is benign.

13. The mobile computing device of claim 12, wherein the processor is configured with processor-executable instructions to use the behavior classifier model based on the generated execution session context vector to determine whether the software application is benign by:
selecting, by the processor, the behavior classifier model based on the generated execution session context vector; and
using the selected behavior classifier model by the processor to determine whether the software application is benign.

14. The mobile computing device of claim 13, wherein the processor is further configured with processor-executable instructions to select the behavior classifier model based on the generated execution session context vector by selecting an application specific classifier model based on the generated execution session context vector.

15. The mobile computing device of claim 13, wherein the processor is further configured with processor-executable instructions to select the behavior classifier model based on the generated execution session context vector by:
identifying mobile computing device features used by the software application or process; and
selecting the behavior classifier model to include the identified features.

16. The mobile computing device of claim 12, wherein the processor is further configured with processor-executable instructions to forward the generated execution session context vector to a second software application or process as input.

17. The mobile computing device of claim 12, wherein the processor is further configured with processor-executable instructions to use the collected behavior information to identify the execution state change event, the timestamp associated with the execution state change event, the user activity, and the timestamp associated with the user activity by performing operations that include:
using the collected behavior information to determine whether the software application or process transitioned from operating in a foreground execution state to operating in a background execution state.

18. The mobile computing device of claim 12, wherein the processor is further configured with processor-executable instructions to monitor user interactions that indirectly engage the software application or process to collect the behavior information by monitoring system calls issued by the software application or process to collect the behavior information.

19. The mobile computing device of claim 12, wherein the processor is further configured with processor-executable instructions to use the collected behavior information to identify the execution state change event, the timestamp associated with the execution state change event, the user activity, and the timestamp associated with the user activity by performing operations that include:
using the collected behavior information to determine whether the software application or process was launched as a result of user interaction with the mobile computing device.

20. The mobile computing device of claim 12, wherein the processor is further configured with processor-executable instructions to monitor user interactions that indirectly engage the software application or process to collect the behavior information by monitoring system activities and user activities of the software application or process.

21. The mobile computing device of claim 12, wherein the processor is further configured with processor-executable instructions to correlate the system activities and the user activities.

22. The mobile computing device of claim 12, wherein the processor is further configured with processor-executable instructions to determine the probability value based on the generated correlation value and the collected behavior information by:
determining the probability value based on static call preferences of the software application.

23. A mobile computing device, comprising:
means for monitoring user interactions that indirectly engage a software application or process to collect behavior information;
means for using the collected behavior information to identify an execution state change event, a timestamp associated with the execution state change event, a user activity, and a timestamp associated with the user activity;
means for generating a correlation value that identifies a degree to which the timestamp associated with the execution state change event matches the timestamp associated with the user activity;
means for determining a probability value based on the generated correlation value and the collected behavior information;
means for generating an execution session context vector based on the collected behavior information and the determined probability value; and means for using a behavior classifier model based on the generated execution session context vector to determine whether the software application is benign.

24. The mobile computing device of claim 23, wherein means for using the behavior classifier model based on the generated execution session context vector to determine whether the software application is benign comprises:
  means for selecting the behavior classifier model based on the generated execution session context vector; and
  means for using the selected behavior classifier model to determine whether the software application is benign.

25. The mobile computing device of claim 23, further comprising means for forwarding the generated execution session context vector to a second software application or process as input.

26. A non-transitory processor-readable medium having stored thereon processor-executable instructions configured to cause a processor to perform operations comprising:
  monitoring user interactions that indirectly engage a software application or process to collect behavior information;
  using the collected behavior information to identify an execution state change event, a timestamp associated with the execution state change event, a user activity, and a timestamp associated with the user activity;
  generating a correlation value that identifies a degree to which the timestamp associated with the execution state change event matches the timestamp associated with the user activity;
  determining a probability value based on the generated correlation value and the collected behavior information;
  generating an execution session context vector based on the collected behavior information and the determined probability value;
  using a behavior classifier model based on the generated execution session context vector to determine whether the software application is benign.

27. The non-transitory processor-readable medium of claim 26, wherein the stored processor-executable instructions are configured to cause the processor to perform operations such that using the behavior classifier model based on the generated execution session context vector to determine whether the software application is benign comprises:
  selecting the behavior classifier model based on the generated execution session context vector; and
  using the selected behavior classifier model to determine whether the software application is benign.

28. The non-transitory processor-readable medium of claim 27, wherein the stored processor-executable instructions are configured to cause the processor to perform operations further comprising forwarding the generated execution session context vector to a second software application or process as input.

* * * * *